United States Patent [19]

Swamikannu

[11] Patent Number: 5,013,448

[45] Date of Patent: May 7, 1991

[54] PROCESS FOR THE PREPARATION OF CHLORINE-RESISTANT POLYESTER SEMIPERMEABLE MEMBRANES

[75] Inventor: A. Xavier Swamikannu, Mt. Prospect, Ill.

[73] Assignee: Allied-Signal Inc., Morris Township, Morris County, N.J.

[21] Appl. No.: 482,445

[22] Filed: Feb. 20, 1990

Related U.S. Application Data

[63] Continuation-in-part of Ser. No. 336,394, Apr. 11, 1989, abandoned, and a continuation-in-part of Ser. No. 336,395, Apr. 11, 1989, abandoned, and a continuation-in-part of Ser. No. 336,161, Apr. 11, 1989, abandoned, and a continuation-in-part of Ser. No. 336,190, Apr. 11, 1989, abandoned.

[51] Int. Cl.$^5$ .................. B01D 61/08; B01D 67/00; B01D 69/00; B01D 71/48

[52] U.S. Cl. .................. 210/642; 210/500.27; 264/41

[58] Field of Search .................. 204/253, 279, 263–266; 264/41, 45.1; 210/634, 642, 649–654, 500.1, 500.21, 500.27, 500.28, 500.33, 500.35

[56] References Cited

U.S. PATENT DOCUMENTS

| | | |
|---|---|---|
| 3,879,495 | 4/1975 | Fujii et al. .................. 525/301 X |
| 4,168,352 | 9/1979 | Dick et al. .................. 429/204 |
| 4,267,295 | 5/1981 | Gallop et al. .................. 526/264 |
| 4,277,334 | 7/1981 | Ruidisch et al. .................. 210/154 |
| 4,415,455 | 11/1983 | Osei-Gyimah et al. .................. 210/654 |
| 4,443,315 | 4/1984 | Iijima et al. .................. 204/253 |
| 4,704,324 | 11/1987 | Davis et al. .................. 210/500.35 X |

FOREIGN PATENT DOCUMENTS

| | | | |
|---|---|---|---|
| 0194008 | 11/1982 | Japan | .................. 210/654 |
| 0130505 | 7/1984 | Japan | .................. 210/500.35 |

Primary Examiner—Frank Sever
Attorney, Agent, or Firm—Harold N. Wells; Mary Jo Ryther; Gerard P. Rooney

[57] ABSTRACT

Semipermeable membranes comprising polyesters which are resistant to chlorine are prepared by casting on a porous support backing material either a solution comprising a blend of a polymeric hydroxyalkyl acrylate and a polymeric monocarboxylic acid, or a polymeric polycarboxylic acid, or a solution containing a prepolymer which has been formed by the reaction of a polymeric hydroxyalkyl acrylate with an acryloyl halide or an anhydride of a dicarboxylic acid. The porous support backing material is contacted with the solution at contacting conditions, following which the excess solution is removed and the solution-coated porous support backing material is then cured at curing conditions. This membrane will possess excellent characteristics of salt rejection and flux as well as being resistant to the action of chlorine which is present in water which is subjected to a desalination process.

59 Claims, No Drawings

PROCESS FOR THE PREPARATION OF CHLORINE-RESISTANT POLYESTER SEMIPERMEABLE MEMBRANES

CROSS-REFERENCES TO RELATED APPLICATIONS

This is a continuation-in-part of the following applications: U.S. Ser. No. 07/336,394, filed Apr. 11, 1989, now abandoned, U.S. Ser. No. 07/336,395, filed Apr. 11, 1989, now abandoned, U.S. Ser. No. 07/336,161, filed Apr. 11, 1989, now abandoned, and U.S. Ser. No. 07/336,190, filed Apr. 11, 1989, now abandoned.

BACKGROUND OF THE INVENTION

The separation of various components found in liquids or gases may be effected in a multitude of processes, the techniques for effecting the separation including ultrafiltration or reverse osmosis. A particular example of the latter type of separation involves a desalination process in which water which is rendered potable or suitable for other purposes is obtained from sea water, contaminated water, brackish water or brine. This process is of especial value in areas of the world where the water found in the area is brackish or is saline in nature. The desalination of this water is necessary in order to provide large amounts of potable or relatively nonsalty water for industrial, agricultural or home use. The desalination of the water is effected by forcing the water through a reverse osmosis membrane whereby the purified water is passed through the membrane and recovered, while the contaminants or salts do not pass through the membrane, thus, in effect, being rejected by the membrane and recovered as the retentate.

A reverse osmosis membrane, in order to be utilized for such a purpose, must possess certain characteristics applicable to the process. For example, the membrane must have a very high salt rejection coefficient. In addition, another important characteristic and a problem which must be addressed when utilizing the membrane is the ability of the membrane to be resistant to chlorine attack. Another important factor which is present in the use of a reverse osmosis membrane is that said membrane also possess a high flux characteristic, that is, the ability to pass a relatively large amount of water through the membrane at relatively low pressures. If a membrane possesses these desirable characteristics, it will be commercially feasible in its applicability to the desalination process.

Inasmuch as the semipermeable membrane which is used for the desalination process should be relatively thin in nature in order to provide a desirable flux rate, it is necessary, in many instances, that the reverse osmosis membrane be composited or laminated on a porous backing support material. This porous support backing material should in itself possess certain characteristics which make it desirable for such a use. For example, the porous support material should possess pore sizes which are sufficiently large enough so that the water or permeate can pass through the support without affecting or lessening the flux rate of the entire composite. Conversely speaking, the pore size should not be large enough so that the thin composite semipermeable membrane will tend to fill up or enter into the pores, thus distorting the shape of the thin film membrane with the attendant possibility of rupturing the membrane, thus causing said membrane to lose its effectiveness in the reverse osmosis process.

Reverse osmosis membranes have been prepared and used from a wide variety of known polymeric materials. While many of these polymeric materials possess the ability of reducing the concentration of a solute to where the salt rejection capability is in excess of 98%, some do not possess the necessary flux rate whereby the volume of water which is required to be produced by the membrane per unit of membrane surface is sufficient for the application of the technology.

Other semipermeable membranes comprise interfacial polymerized composites. An example of this type of membrane is found in U.S. Pat. No. 4,277,334 in which the membrane is prepared from a cross-linked interfacially polymerized aromatic polyamine which has been prepared from an essentially monomeric polyacyl halide and an essentially monomeric arylene polyamine. U.S. Pat. No. 4,415,455 describes a membrane which may be used for the desalination of water which comprises a copolymer of methacrylic acid and a hydroxy containing monomer such as hydroxyethyl methacrylate with the optional addition of a polyfunctional carboxylic acid. The purpose of the latter compound which may be exemplified by a low molecular weight compound such as 1,2,4,5-benzene tetracarboxylic acid or citric acid is to function as a cross-linking agent.

Other U.S. patents which disclose membranes which may be utilized in a reverse osmosis process include U.S. Pat. No. 4,168,352. This patent describes membranes which are produced by polymerizing a monomer such as hydroxyethyl methacrylate which is present in a mixture of the monomer and a polymer such as polyacrylic acid. The polymerization of these compounds is initiated in a photochemical manner and the resulting membrane will contain a homopolymer of the hydroxyethyl methacrylate mixed with other polymers. There is no chemical link present between the polymeric hydroxyethyl methacrylate and the polycarboxylic acid. Likewise, U.S. Pat. No. 4,267,295 discloses hydrogel compositions which are produced by cross-linking a mixture of acrylates including glyceryl methacrylate, methyl methacrylate, hydroxyethyl acrylate and a diacrylate such as ethylene glycol dimethacrylate. The initiation of the polymer is effected by the use of a free radical initiator as exemplified by azobisisobutyronitrile (AIBN). The resulting membrane has free hydroxy groups which do not react during the formation of the membrane, the composition of the finished membrane being a cross-linked random copolymer of the various monomers.

In contradistinction to these prior patents, the present invention is concerned with a process for preparing a polyester semipermeable membrane which may be used in a reverse osmosis process in which a solution is coated on a porous support backing material and cured to form a membrane which exhibits excellent characteristics including the properties of chlorine-resistance, good flux and separation. The solution comprises either a blend of two polymers which will cross-link during curing to form the polyester membrane during an acid-catalyzed esterification reaction or a polyester prepolymer which has been formed by the reaction of a polymeric hydroxyalkyl acrylate with an acryloyl halide or an anhydride of a dicarboxylic acid and which will cross-link during curing on the backing material to form the polyester membrane.

BRIEF SUMMARY OF THE INVENTION

This invention relates to a process for the preparation of reverse osmosis membranes and to the use thereof in a desalination process. More specifically, the invention is concerned with a process for the preparation of reverse osmosis membranes which exhibit an extreme resistance to chlorine degradation.

As was previously discussed, the use of reverse osmosis membranes for the separation of liquid from liquid or solids from liquids are important articles of commerce. This is especially true in the area of desalination whereby water which is brackish or saline in nature may be rendered potable or suitable for use in other industrial or agricultural regions by passing the water through reverse osmosis membranes. In many instances a chlorine containing compound such as various chloroamines, hypochlorites or chlorine dioxide are added to saline water as a disinfectant or for antibacterial purposes. The saline water is then treated by aeration or chemically prior to desalination to remove the chlorine-containing compound. However, in many instances the complete removal is not effected and a relatively small but harmless amount of the compound will remain in the water. The presence of the chlorine-containing compound in the water to be desalinated will constitute a threat to the efficiency and long life of most reverse osmosis membranes. However, it has now been discovered that membranes prepared according to the process hereinafter set forth in greater detail and used in accordance with the process of desalination will be resistant to chlorine attack and thus may be used for a longer period of time than other membranes while maintaining the desirable properties of salt rejection and flux.

The particular membranes which constitute the inventive feature of the present application will comprise a polyester formed by reacting a polymeric hydroxyalkyl acrylate with a polymeric monocarboxylic acid, a polymeric polycarboxylic acid, an anhydride of a dicarboxylic acid, or an acryloyl halide, which is supported on a porous support backing material. By utilizing these membranes in a desalination process, it is possible to treat a saline or brackish water solution under a relatively long period of time without replacement of the membrane, the long life of the membrane being, in part, due to the resistance to degradation resulting from exposure to chlorine in the water solution.

It is therefore an object of this invention to provide a process for preparing a semipermeable membrane which is resistant to chlorine, thus rendering the membrane suitable for use in separation processes such as desalination of water where chlorine is present in an amount sufficient to degrade other types of membranes.

Another object of this invention is to provide a process for the desalination of saline water utilizing reverse osmosis membranes prepared according to the process of this invention.

In one aspect, an embodiment of this invention resides in a process for the preparation of a chlorine-resistant polyester semipermeable membrane which comprises contacting a porous support backing material at contacting conditions with a solution comprising a blend of two polymers which form a polyester during an acid-catalyzed esterification of a polymeric hydroxyalkyl acrylate with a polymeric monocarboxylic acid or a polymeric polycarboxylic acid, or, alternatively, contacting a porous support backing material with a solution comprising a prepolymer which has been formed by the reaction of a polymeric hydroxyalkyl acrylate with an acryloyl halide or an anhydride of a dicarboxylic acid, recovering the resultant solution-coated porous support composite, curing said composite at curing conditions, and recovering the resultant chlorine-resistant polyester semipermeable membrane.

A specific embodiment of this invention is found in a process for the preparation of a chlorine-resistant polyester semipermeable membrane which comprises contacting a porous support backing material such as polysulfone with an aqueous alcoholic solution containing an acid catalyst and poly(hydroxyethyl acrylate) with polyacrylic acid, or polyitaconic acid at a temperature in the range of from about ambient to about 60° C., a pressure in the range of from about atmospheric to about 1034 kPa (gauge), for a time in the range of from about 2 seconds to about 5 minutes, recovering the resulting solution-coated polysulfone composite, curing said composite at a temperature in the range of from about 100° to about 150° C. at a pressure in the range of from about subambient to about 207 kPa (gauge) for a time in the range of from about 10 minutes to about 60 minutes, and recovering the resultant membrane.

Another embodiment of this invention is found in a process for the preparation of a chlorine-resistant polyester semipermeable membrane which comprises contacting a porous support backing material such as polysulfone with an aqueous alcoholic solution containing an acid catalyst with a prepolymer prepared by the base-catalyzed esterification of poly(hydroxyethyl acrylate) with phthalic anhydride at a temperature in the range of from about ambient to about 60° C., a pressure in the range of from about atmospheric to about 1034 kPa (gauge), for a time in the range of from about 2 seconds to about 5 minutes, recovering the resulting solution-coated polysulfone composite, curing said composite at a temperature in the range of from about 100° to about 150° C. at a pressure in the range of from about subambient to about 207 kPa (gauge) for a time in the range of from about 10 minutes to about 60 minutes, and recovering the resultant membrane.

Another embodiment of this invention is found in a process for the preparation of a chlorine-resistant semipermeable membrane which comprises reacting a poly(hydroxyethyl methacrylate) with acryloyl chloride to form a prepolymer, contacting a porous support backing material such as polysulfone with said prepolymer at a temperature in the range of from about −20° C. to about 60° C., a pressure in the range of from about atmospheric to about 1034 kPa (gauge) for a period in the range of from about 2 seconds to about 5 minutes, removing excess prepolymer, curing said prepolymer at a temperature in the range of from about ambient to about 150° C. and a pressure in the range of from about atmospheric to about 689 kPa (gauge) by exposure to a source under an ultraviolet irradiation, and recovering the resultant chlorine-resistant semipermeable membrane.

Other objects and embodiments will be found in the following further detailed description of the invention.

DESCRIPTION OF THE INVENTION

As hereinbefore set forth, the present invention is concerned with the process for preparing semipermeable membranes which exhibit an excellent resistance to chlorine as well as possessing a high degree of flux and rate of rejection. The membranes which are polyester in nature are prepared by casting on a porous support backing material either a solution comprising a blend of a polymeric hydroxyalkyl acrylate and a polymeric monocarboxylic acid or a polymeric polycarboxylic acid, or a solution containing a prepolymer which has been formed by the reaction of a polymeric hydroxyalkyl acrylate and an acryloyl halide or an anhydride of a dicarboxylic acid. An aqueous alcoholic solution containing an acid catalyst may be utilized as a medium for the two components in the polyester formation when the second component is either the polymeric monocarboxylic acid, or the polymeric polycarboxylic acid. Where the second component is an acryloyl halide or an anhydride of a dicarboxylic acid, the reaction to form the prepolymer is done in a solution comprising a suitable solvent, the prepolymer recovered, and the casting done in a coating solution comprising the prepolymer and a second solvent. The porous support backing material is contacted with the solution at contacting conditions, following which the excess solution is removed and the solution-coated porous support backing material is cured at curing conditions to form the desired chlorine-resistant polyester semipermeable membrane which exhibits favorable characteristics with respect to salt rejection and flux.

Where the membranes are prepared by casting on a porous support backing material either a solution comprising a blend of a polymeric hydroxyalkyl acrylate and a polymeric monocarboxylic acid or a polymeric polycarboxylic acid, the two polymeric materials, one containing hydroxyl moieties and the other containing carboxyl moieties, are utilized to control the cross-link density of the membrane as well as the molecular weight. This is in contradistinction to the membrane formed according to the process set forth in U.S. Pat. No. 4,415,455, previously discussed, in which a copolymer is formed from a starting copolymer which contains carboxyl and hydroxyl moieties on the same molecule and in which cross-link density cannot be controlled as readily.

Components of the Membrane

One component of the copolymer forming a polyester membrane of the present invention comprises a polymeric hydroxyalkyl acrylate in which the alkyl portion of the compound contains from 1 to about 4 carbon atoms. Some examples of these acrylates will include poly(hydroxymethyl acrylate), poly(hydroxyethyl acrylate), poly(hydroxypropyl acrylate), poly(hydroxybutyl acrylate), poly(hydroxypentyl acrylate), poly(hydroxymethyl methacrylate), poly(hydroxyethyl methacrylate), poly(hydroxypropyl methacrylate), poly(hydroxybutyl methacrylate), poly(hydroxypentyl methacrylate), etc.

The second component which is utilized to form the desired polyester membrane will comprise a polymeric monocarboxylic acid, a polymeric polycarboxylic acid, an anhydride of a dicarboxylic acid, or an acryloyl halide. The polymeric monocarboxylic acid will be selected from the group consisting of polyacrylic acid and polymethacrylic acid. The polymeric polycarboxylic acid is derived from monomers unsaturated in nature which may contain from 4 to about 8 carbon atoms. Representative examples of the monomers include fumaric acid, maleic acid, glutaconic acid, citraconic acid, itaconic acid, ethylidenemalonic acid, mesaconic acid, allylmalonic acid, propylidenemalonic acid, hydromuconic acid, allylsuccinic acid, carbocaprolactonic acid, teraconic acid, etc. The anhydride of the dicarboxylic acid may contain from 2 to about 10 carbon atoms.

Some representative examples of these anhydrides will include anhydrides of a saturated dicarboxylic acid such as oxalic anhydride, malonic anhydride, succinic anhydride, glutaric anhydride, adipic anhydride, pimelic anhydride, suberic anhydride, azelaic anhydride, sebacic anhydride, etc., anhydrides of unsaturated dicarboxylic acids such as fumaric anhydride, maleic anhydride, glutaconic anhydride, citraconic anhydride, itaconic anhydride, mesaconic anhydride, allylmalonic anhydride, hydromuconic anhydride, teraconic anhydride, etc., cycloaliphatic anhydrides such as 1,2-cyclopentanedicarboxylic anhydride, 1,2-cyclohexanedicarboxylic anhydride, 1,2-cycloheptanedicarboxylic anhydride, cyclopentene-1,2-dicarboxylic anhydride, cyclohexene-1,2-dicarboxylic anhydride, etc., aromatic anhydrides such as phthalic anhydride, isophthalic anhydride, terephthalic anhydride, naphthalic anhydride, etc. Representative examples of the acryloyl halide include acryloyl chloride, acryloyl bromide, acryloyl iodide, acryloyl fluoride, methacryloyl chloride, methacryloyl bromide, methacryloyl iodide, and methacryloyl fluoride.

Backing Material

Examples of porous support backing materials upon which the polyester may be coated will comprise those polymeric materials containing pore sizes which are sufficient to permit the passage of permeate therethrough, but are not of sufficient size as to interfere with the bridging over of the resulting ultrathin semipermeable membrane. In the preferred embodiment of the invention, the pore sizes of the porous support backing material will range from about 1 to about 1,000 millimicrons. Pores which are greater than 1,000 millimicrons will permit the ultrathin semipermeable membrane to sag into the pore, thus disrupting the uniform configuration which is a desirable characteristic of the membrane. Examples of porous support backing materials which may be employed to prepare the desired membrane composite will include such polymers as polysulfone, polycarbonate, microporous polypropylene, the various polyamides, polyphenylene ethers, etc.

Prepolymer Formation

In one embodiment, the chlorine-resistant semipermeable membranes formed by the process of the present invention may be prepared by reacting a polymeric hydroxyalkyl acrylate and an acryloyl halide or an anhydride of a dicarboxylic acid in a suitable solvent containing a base catalyst to form a prepolymer by base-catalyzed esterification, recovering the prepolymer, and coating a porous support backing material with a solution comprising the prepolymer. The mole ratio of the hydroxyalkyl acrylate and acryloyl chloride in the solvent is in the range of from about 0.1:1 to about 1.0:0.1 moles of the hydroxyalkyl acrylate per mole of acryloyl halide. The mole ratio of the hydroxyalkyl acrylate and the anhydride of a dicarboxylic acid is in the range of from about 1.0:0.9 to about 1.0:0.1 moles of polymeric hydroxyalkyl acrylate per mole of anhydride of a dicarboxylic acid. Examples of the base catalysts used for the base-catalyzed esterification are triethylamine, tripropylamine, tributylamine, pyridine, and dimethylaminopyridine. The prepolymer formation is carried out at temperatures ranging from subambient up to the boiling point of the solvent utilized and at pressures from atmospheric up to about 1724 kPa (gauge). The solvents utilized to prepare the prepolymer are those which will dissolve both components without interfering with the esterification reaction and will include dimethylformamide, N-methylpyrrolidone, dimethylacetamide, etc.

Coating Solution

Where the membranes are prepared by casting on a porous support backing material a solution comprising a blend of a polymeric hydroxyalkyl acrylate and a polymeric monocarboxylic acid or a polymeric polycarboxylic acid or a solution comprising a prepolymer formed by the base-catalyzed esterification of a hydroxyalkyl acrylate and an anhydride of a dicarboxylic acid, the coating of the porous support backing material is done in an aqueous alcoholic solution containing an acidic catalyst. The catalyst comprises acids such as sulfuric acid, benzene sulfonic acid, the isomeric toluene sulfonic acids, etc. The preferred alcohols which are used to form a portion of the coating solution will include methyl alcohol, ethyl alcohol, propyl alcohol, isopropyl alcohol, butyl alcohol, etc. The ratio of alcohol to water in the solution may vary over a relatively wide range, the percentage of alcohol to water being usually in the range of from about 0.2:1 to about 2:1, although it is also contemplated within the scope of this invention that ratios outside this range may also be utilized, although not necessarily with equivalent results. The polymeric hydroxyalkyl acrylate and monocarboxylic acid are present in the alcoholic coating solution in a mole ratio in the range of from about 0.1:1.0 to about 1.0:0.1 moles of polymeric hydroxyalkyl acrylate per mole of polymeric monocarboxylic acid. The polymeric hydroxyalkyl acrylate and polymeric polycarboxylic acid are present in the alcoholic coating solution in a mole ratio in the range of from about 0.1:1.0 to about 1.0:0.1 moles of polymeric hydroxyalkyl acrylate per mole of polymeric polycarboxylic acid. The prepolymer formed by the basecatalyzed esterification of a polymeric hydroxyalkyl acrylate and an anhydride of a dicarboxylic acid is present in the alcoholic coating solution in about 0.2 to about 3.0 wt.% of prepolymer in the alcoholic solution. The desired polyester membrane will be formed by the acid catalyzed esterification of the polymer(s) coated on the backing material.

Where the chlorine-resistant semipermeable membrane is prepared by coating a porous support backing material with a solution comprising a prepolymer formed by reacting a polymeric hydroxyalkyl acrylate and an acryloyl halide in a suitable solvent, the amount of prepolymer in the coating solution ranges up to 5.0%, preferably from about 0.05% to about 1.0%. Representative examples of the solvents used are benzene, toluene, xylene, pentane, hexane, heptane, etc.

Coating Conditions

The coating of the porous support backing material is effected at contacting conditions which will include a temperature in the range of from about ambient (20–25° C.) to about 60° C. for the coating solutions comprising a hydroxyalkyl acrylate and a polymeric monocarboxylic acid or a polymeric polycarboxylic acid, or comprising a prepolymer formed by the base-catalyzed esterification of hydroxyalkyl acrylate with an anhydride of a dicarboxylic acid, and a temperature in the range of about −20° C. to about 60° C. for the solution comprising a prepolymer formed by reacting a hydroxyalkyl acrylate and an acryloyl halide. The coating conditions will include a pressure in the range of from about atmospheric to about 1034 kPa (gauge). The porous support backing material is contacted with the coating solution for a predetermined period of time which may range from about 2 seconds to about 5 minutes in duration. At the end of this time the porous support backing material is removed from the coating solution bath, the excess solution is removed either by draining or by passage over a knife and subjected to a curing step.

Possible Preparation in a Continuous Manner

It is also contemplated within the scope of this invention that the chlorine-resistant thin film composite polyester membrane may be prepared in a continuous manner of operation. When this type of operation is employed, the porous support backing material is continuously passed through a bath of the coating solution for a predetermined period of time. After passage through the bath, the coated backing material is continuously withdrawn and, if so desired, passed between rollers in order to remove any excess solution which may be present on the surface of the backing material. Following this the semipermeable membrane composite may then be cured as, for example, by passage through an oven which is maintained at a desired curing temperature and pressure, the passage through said oven being at a predetermined rate so as to avoid any possible damage to the composite membrane.

Curing Conditions

The curing of the composite membrane when the second component is either monomeric polycarboxylic acid, polymeric polycarboxylic acid, or an anhydride of a dicarboxylic acid may be effected over a wide range of temperature, said range being from about 100° to about 150° C. and a pressure which may range from subambient to about 207 kPa (gauge) for a period of time which may range from about 10 minutes to about 60 minutes or more in duration. The operating parameters of temperature, pressure and time will be interdependent, the primary criteria for the curing of the membrane being that said curing time is sufficient to provide a thin film composite semipermeable membrane but being insufficient to affect the desired characteristics of the thin film membrane and the porous support backing material. For example, excess heat or curing time may act to affect the pore size of the porous support backing material, thus resulting in decrease of the desired flux rate of the membrane.

It is also contemplated within the scope of this invention that when the chlorine resistant semipermeable membrane is formed by coating a porous support backing material with a prepolymer prepared from a hydroxyalkyl acrylate and either an anhydride of an unsaturated dicarboxylic acid or an acryloyl halide, the curing or cross-linking of the membrane may be accomplished by utilizing either photochemical or thermal cross-linking or curing methods. The thermal cross-linking or curing may be accomplished by heating the polyester to a temperature in the range of from about 50° to about 150° C. for a period of time sufficient to effect the desired cross-linkage. Likewise, the membrane may be cured or cross-linked by subjecting the composite to irradiation from various sources including ultraviolet, xrays, electron beams, etc. For example, the ultraviolet radiation may be accomplished by subjecting the membrane composite to irradiation from an ultraviolet light source possessing a wave length of from about 1800 to about 3900 Angstroms such as that obtained from xenon, mercury-vapor, tungsten lamps or UV lasers. Additionally, the composite may be subjected to irradiation from an energy source such as electron beam in which the energy dosage which is applied to the composite is relatively low, that is, in a range of from about 0.1 to about 10.0 Mrads. If so desired, suitable photosensitizers or photoinitiators may be present in the coating composition. Examples of such photoinitiators comprise p,p'-bis(dimethylamino)benzophenone, α,α-dimethoxyphenylacetophenone, α,α-diethoxyacetophenone, α-hydroxy-α,α-dimethoxyacetophenone, 1-benzoylcyclohexanol, uranylnitrate, combinations of benzophenone and Michler's ketone, etc. It is contemplated within the scope of this invention that the cross-linking of the prepolymer by irradiation from ultraviolet light or electron beams may also be effected in the presence of an onium or aryl-onium salt such as diphenyliodonium hexafluoroantimony or triphenylsulfonium hexafluorophosphate.

Cross-linking by free radical initiation may be done for the prepolymer formed by reacting a polymeric hydroxyalkyl acrylate with an acryloyl halide. The prepolymer formed by reacting a polymeric hydroxyalkyl acrylate with an anhydride of a dicarboxylic acid is cross-linked by an acid-catalyzed esterification. Additionally, where the anhydride is of an unsaturated dicarboxylic acid, free radical initiation may then be done to further cross-link the vinyl groups. This procedure is accomplished by treating the polyester at elevated temperatures in the presence of free radical initiators such as 2,2-azobisisobutyronitrile, benzoyl peroxide, t-butyl peroxide, t-butyl perbenzoate, di-t-butyl peroxyoxalate, diisopropylperoxydicarbonate, potassium persulfate, a mixture of hydrogen peroxide in a ferrous compound, a combination of reducing and oxidizing agents including reducing agents such as sodium hyposulfite, sodium metabisulfite, sodium sulfide, sodium thiosulfate, hydrazine hydrate and oxidizing agents such as potassium persulfate, potassium ferricyanide, cumene hydroperoxide, pinane hydroperoxide, diisopropylbenzene hydroperoxide, etc.

Water Treatment Process

The separation process involving the desalination of sea water or brackish water as well as other treatments of water such as softening of hard water whereby salts are removed, concentration of whey, etc., is effected in a reverse osmosis type separation. The reverse osmosis system or apparatus which is employed to effect the separation may comprise any of the various types of reverse osmosis apparatus which are known in the art. The membranes which are employed in this system are in the form of flat sheets which are particularly applicable for use in reverse osmosis modules either in a single sheet or in multiple sheet units whereby the sheet or sheets are wound in a spiral type configuration. In the preferred embodiment of the invention, the separation process is employed in a continuous type of operation in which the water is charged from a reservoir containing the same in a feedstream which contacts the upstream face of the chlorine-resistant semipermeable membrane of the present invention. Passage through this membrane results in producing a permeate and a retentate, the permeate comprising the desalinated water while the retentate comprises the unwanted salts or other contaminants present in the saline water feedstream. As was previously discussed, the saline water feedstream also contains a chlorine-containing compound of the type previously set forth in greater detail which has been added as a disinfectant or as an antibacterial agent. The separation process is usually effected at separation conditions which may include a temperature in the range of from about ambient to about 50° C. and an applied pressure in the range of from about 1380 kPa (gauge) to about 6895 kPa (gauge).

Examples of Membranes Prepared with a Hydroxyalkyl Acrylate and a Monocarboxylic Acid

EXAMPLE I

A solution was prepared by admixing 0.605 g of poly(hydroxyethyl methacrylate), 0.303 g of polyacrylic acid, 1.815 g sulfuric acid, 81.1 g of water, and 75.1 g of ethyl alcohol. A chlorine-resistant semipermeable membrane was prepared by handcasting this solution on a 8×10" microporous polysulfone sheet at ambient temperature and pressure. After a period of 3 minutes of contact time the excess solution was drained and the composite was cured in an oven at a temperature of 120° C. for a period of 30 minutes. This membrane was designated as A.

EXAMPLE II

In like manner a solution was prepared containing 0.25 g of poly(hydroxyethyl methacrylate), 0.125 g of polyacrylic acid, 0.75 g sulfuric acid, 61.1 g of water, and 56.1 g of ethyl alcohol. The solution was then handcast on a sheet of microporous polysulfone for a period of 3 minutes, following which the excess solution was drained. The composite was then cured in an oven at a temperature of 120° C. for a period of 30 minutes to produce a semipermeable membrane. This membrane was designated as B.

EXAMPLE III

To 50 cc of the solution prepared according to Example II above was added 0.2 cc of sulfuric acid. A semipermeable membrane was prepared according to the procedure hereinbefore set forth and the membrane after curing at identical conditions was designated as C.

EXAMPLE IV

In this example a solution containing 0.13 g of poly(hydroxyethyl methacrylate), 0.10 g of polyacrylic acid, 0.407 g sulfuric acid, 25 g of water, and 25 g of ethyl alcohol was handcast on a polysulfone support at ambient temperature and pressure. After a period of 3 minutes the excess solution was drained, and the composite was cured at a temperature of 120° C. for a period of 30 minutes in an oven. This membrane was designated as D.

EXAMPLE V

Samples of the membranes prepared according to the above examples in a size of 1×3" were placed in a cell and a water feed was passed over the surface of the membrane at a feed flow rate of 0.13 gal/min. The test conditions which were employed during the tests included a pressure of 1380 kPa (gauge) on one side of the membrane while the other side of the membrane was maintained at atmospheric pressure. In addition, temperature which was employed during the test was ambient. Various feeds were utilized during the tests; one feed containing 0.2% sodium chloride, another feed containing 0.2% magnesium sulfate and a third feed containing 0.2% sodium sulfate. The feed was passed over the surface of the membrane for a period of 1 hour while recirculating the retentate and permeate. Periodic samples of the permeate were bled for testing. The results of these tests are set forth in Table 1 below.

TABLE 1

| Membrane | Feed | Rejection Rate % | Flux (GFD) |
|---|---|---|---|
| A-1 | 0.2% NaCl | 82.1 | 1.9 |
| A-2 |  | 83.1 | 1.33 |
| A-1 | 0.2% MgSO$_4$ | 88.6 | 1.60 |
| A-2 |  | 85.3 | 1.25 |
| B-1 | 0.2% MgSO$_4$ | 90.5 | 7.42 |
| B-2 |  | 80.5 | 10.6 |
| B-3 |  | 85.7 | 9.3 |
| C-1 | 0.2% NaCl | 82.6 | 2.5 |
| C-2 |  | 88.6 | 3.0 |
| C-3 |  | 80.4 | 3.0 |
| C-1 | 0.2% Na$_2$SO$_4$ | 90.7 | 3.0 |
| C-2 |  | 94.9 | 3.5 |
| C-3 |  | 95.1 | 3.6 |
| D-1 | 0.2% NaCl | 88.4 | 2.0 |
| D-2 |  | 84.4 | 2.9 |
| D-3 |  | 88.9 | 2.8 |
| D-1 | 0.2% Na$_2$SO$_4$ | 97.8 | 4.82 |
| D-2 |  | 97.1 | 5.04 |
| D-3 |  | 97.1 | 5.0 |

EXAMPLE VI

In this example, a semipermeable membrane was prepared according to the method set forth in Example II above. The sheet of membrane produced according to this process was cut into two small samples labeled E1 and E2, 1×3" in size and tested in a Chlorine Test Loop. Tap water was used as the feed while chlorine was added continuously to keep the free chlorine level at 10 ppm for the first 150 hours and thereafter at a level of 20 ppm. Periodically samples were removed and salt rejections and water fluxes were measured. The membrane rejections and fluxes are listed as a function of chlorine exposure, which is the product of chlorine concentration and ppm and the number of hours exposed to chlorine. The results of these tests are set forth in Table 2 below.

TABLE 2

| HOUR | E1 REJECTION RATE % | E1 GFD | E2 REJECTION RATE % | E2 GFD | CHLORINE | PPM HOUR |
|---|---|---|---|---|---|---|
| 0 | 74.6 | 3.25 | 78.9 | 3.5 | 0 | 0 |
| 1 | 76.5 | 3.91 | 81.3 | 3.72 | 25 | 25 |
| 25 | 74.1 | 3.95 | 77.5 | 3.74 | 7.5 | 205 |
| 35 | 69.5 | 4.15 | 70.5 | 3.78 | 15 | 355 |
| 60 | 72.3 | 4.7 | 76.7 | 4.24 | 7.5 | 555 |
| 84 | 70.4 | 3.4 | 75.3 | 3.4 | 15 | 915 |
| 97 | 72 | 3.8 | 75.8 | 3.6 | 15 | 1110 |
| 107 | 73.3 | 3.6 | 76.2 | 3.34 | 10 | 1210 |
| 126 | 73.4 | 3.7 | 77.7 | 3.2 | 10 | 1400 |
| 140 | 75.3 | 3.85 | 77.8 | 4.04 | 10 | 1565 |
| 152 | 75.2 | 4.04 | 76.1 | 3.79 | 10 | 1685 |
| 176 | 73.4 | 4.14 | 75.5 | 3.93 | 20 | 1985 |
| 188 | 72.5 | 4.02 | 74.2 | 3.77 | 15 | 2165 |
| 200 | 72.2 | 3.92 | 73.7 | 3.66 | 15 | 2345 |
| 224 | 70.4 | 4.46 | 71.2 | 3.83 | 25 | 2945 |
| 238 | 80.2 | 4.12 | 81.3 | 3.84 | 0 | 3045 |
| 248 | 72.2 | 3.31 | 75.6 | 3.49 | 20 | 3225 |
| 260 | 73.5 | 3.74 | 73.5 | 3 | 15 | 3405 |
| 272 | 72.7 | 3.19 | 75 | 3.56 | 15 | 3585 |
| 284 | 73.7 | 4.2 | 74.7 | 4.01 | 12.5 | 3735 |
| 296 | 73.5 | 4.11 | 75.6 | 3.88 | 25 | 4055 |
| 308 | 73 | 4.39 | 74.7 | 4.03 | 25 | 4330 |
| 320 | 73.5 | 4.04 | 76.3 | 3.54 | 20 | 4570 |
| 332 | 72.5 | 3.66 | 74.4 | 3.81 | 15 | 4750 |
| 346 | 72.8 | 4.01 | 74.4 | 3.6 | 15 | 4930 |
| 356 | 72 | 3.7 | 72.5 | 3.67 | 20 | 5130 |
| 370 | 70.7 | 3.95 | 75.1 | 3.85 | 15 | 5333 |
| 394 | 73.5 | 3.84 | 71.8 | 3.6 | 50 | 6183 |
| 404 | 80 | 4.97 | 80.5 | 4.71 | 25 | 6433 |
| 416 | 73.9 | 4.04 | 74.7 | 3.93 | 20 | 6673 |
| 440 | 73.7 | 3.9 | 75.1 | 3.76 | 25 | 7273 |
| 452 | 75.1 | 3.79 | 77.2 | 3.66 | 37.5 | 7475 |
| 476 | 75.9 | 3.66 | 76.1 | 3.59 | 37.5 | 8375 |
| 476 | 75.9 | 3.7 | 76.1 | 3.6 | 37.5 | 8375 |
| 512 | 76.6 | 3.9 | 77.1 | 3.32 | 125 | 9913 |
| 522 | 74.2 | 3.9 | 74.7 | 3.73 | 100 | 10913 |
| 534 | 74 | 3.6 | 73 | 3.6 | 87.5 | 11963 |
| 546 | 70 | 3.8 | 71.8 | 3.6 | 62.5 | 12713 |
| 559 | 73.5 | 4 | 74.2 | 4 | 107 | 14104 |
| 570 | 73 | 4 | 71 | 4.2 | 87.5 | 15067 |
| 582 | 72.5 | 4.2 | 72.1 | 4.1 | 62.5 | 15817 |
| 594 | 71.1 | 3.13 | 72.2 | 3.8 | 100 | 17017 |
| 606 | 75 | 3.7 | 74.4 | 3.3 | 87.5 | 18067 |
| 618 | 72 | 3.1 | 73.7 | 3.52 | 100 | 19267 |
| 654 | 72.4 | 4.21 | 73.5 | 4 | 125 | 22867 |
| 678 | 71.8 | 3.22 | 71.9 | 3 | 100 | 24067 |
| 690 | 72.4 | 3.37 | 71.9 | 3.49 | 110 | 25267 |
| 714 | 70.9 | 3.41 | 70 | 3.6 | 125 | 29359 |
| 738 | 74.4 | 4 | 74.3 | 3.5 | 100 | 31609 |
| 750 | 77.3 | 4.15 | 78.4 | 3.88 | 100 | 32409 |
| 762 | 75.5 | 3.9 | 75.4 | 3.8 | 200 | 34800 |
| 774 | 76.3 | 3.2 | 75.8 | 3.43 | 300 | 37800 |
| 786 | 77.3 | 3 | 76.3 | 2.9 | 1000 | 47000 |

It is readily apparent from the above table that the membranes retained their resistance to chlorine and degradation inasmuch as the fluxes and rejection rates were constant after a period of 47,000 chlorine ppm hours or 786 hours of actual operation.

EXAMPLE VII

As a further example, a series of membranes were prepared using a continuous casting technique. The process was effected by continuously passing a sheet of polysulfone through a bath of water and ethyl alcohol containing a 0.23% by weight of poly(hydroxyethyl methacylate), 0.20% by weight of polyacrylic acid, and 0.20% by weight of sulfuric acid. The rate of passage of the polysulfone sheet through the bath was effected at a speed of 2 ft/min. at atmospheric pressure and ambient temperature, the contact time of the polysulfone sheet with the solution lasting for a period of 10 sec. The sheet of coated polysulfone was continuously withdrawn, the excess solution was drained therefrom and thereafter subjected to a curing step in an oven at a temperature of 120° C. for a period of 30 minutes.

Samples of the prepared membrane were placed in a cell in a feedstock comprising water containing 0.2% sodium chloride was passed over the surface of the membrane at a temperature of 25° C. and at a pressure of 2760 kPa (gauge) applied to one side of the membrane, the other side of the membrane being maintained at atmospheric pressure. The permeate was analyzed for salt rejection. Results of these tests are set forth in Table 3 below.

TABLE 3

Results of Polyester Continuous Casting

| MEMBRANE | % REJECTION | GFD |
| --- | --- | --- |
| 1 | 87.30 | 18.99 |
| 2 | 90.97 | 23.15 |
| 3 | 88.58 | 20.27 |
| 4 | 91.52 | 22.52 |
| 5 | 86.73 | 25.63 |
| 6 | 93.93 | 14.61 |
| 7 | 80.01 | 52.03 |
| 8 | 87.74 | 28.81 |

EXAMPLE VIII

To illustrate the excellent characteristics of salt rejection and flux of the chlorine-resistant polyester semipermeable membranes of the present invention when compared to other semipermeable membranes, a comparative test was run between the present membranes and a membrane comprising a sulfonated polysulfone supplied by Millipore Corp. Again samples of membranes of the present invention were prepared according to the method set forth in the above examples in which the membrane comprised a copolymer of poly(hydroxyethyl methacrylate) and polyacrylic acid. The tests were performed by placing membranes in a cell and subjecting them to a water feed containing either 0.2% sodium chloride or 0.2% sodium chloride plus 75 ppm calcium chloride. The tests were effected at a temperature of 25° C. and a pressure of 1380 kPa (gauge). Again the permeate was analyzed for salt rejection and the results are set forth in Table 4 below.

TABLE 4

Comparison of Millipore (Sulfonated Polysulfone) and the Polyester Membrane Samples

| | (1) 0.2% NaCl | | (2) 0.2% NaCl + 75 ppm CaCl₂ | | (3) 0.2% NaCl | |
| --- | --- | --- | --- | --- | --- | --- |
| | % Rej. | GFD | % Rej. | GFD | % Rej. | GFD |
| Millipore | | | | | | |
| 1 | 87.5 | 37.8 | 78.6 | 32.9 | 88.5 | 29.1 |
| 2 | 77.2 | 33.3 | 69.5 | 28.7 | 79.9 | 27.0 |
| Polyester Membrane | | | | | | |
| 1 | 90.4 | 5.4 | 86.2 | 3.85 | 91.7 | 4.1 |
| 2 | 88.3 | 5.4 | 83.3 | 3.66 | 87.9 | 3.5 |
| 3 | 90.3 | 7.8 | 86.5 | 4.94 | 93.5 | 5.5 |
| 4 | 91.2 | 7.0 | 88.4 | 4.49 | 94.3 | 5.0 |

| | (4) 0.2% NaCl + 75 ppm CaCl₂ | | (5) 0.2% NaCl | |
| --- | --- | --- | --- | --- |
| | % Rej. | GFD | % Rej. | GFD |
| Millipore | | | | |
| 1 | 80.9 | 21.0 | 88.7 | 19.2 |
| 2 | 69.5 | 21.4 | 80.3 | 22.7 |
| Polyester Membrane | | | | |
| 1 | 87.0 | 2.9 | 90.1 | 3.54 |
| 2 | 81.6 | 2.8 | 85.6 | 3.62 |
| 3 | 89.2 | 3.9 | 92.6 | 5.00 |
| 4 | 90.4 | 3.5 | 93.3 | 4.66 |

It is to be noted that while both the Millipore and polyester resin membranes were resistant to chlorine and possessed similar sodium chloride rejection, the Millipore membrane was sensitive to multivalent ions such as calcium, while the polyester membranes of the present invention were relatively unaffected by these ions.

Examples of Membranes Prepared with a Hydroxyalkyl Acrylate and a Polycarboxylic Acid

EXAMPLE IX

A solution may be prepared by admixing 1.3 g of poly(hydroxyethyl methacrylate), 1.3 g of poly(itaconic acid), 0.2 g of sulfuric acid and a 50/50 volume/volume mixture of water and ethyl alcohol. A desired chlorine resistant semipermeable membrane may be prepared by handcasting this solution on an 8"×10" microporous polysulfone sheet at ambient temperature and pressure. After a contact time of 3 minutes the excess solution is drained and the composite is cured in an oven at a temperature of 120° C. for a period of 30 minutes.

EXAMPLE X

In a manner similar to that set forth in Example I above, a solution is prepared by admixing 1.3 g of poly(hydroxymethyl methacrylate), 1.16 g of poly(fumaric acid), along with 0.2 g of sulfuric acid, 50 g of water and 50 g of ethyl alcohol. The solution is then handcast on a sheet of microporous polysulfone for a period of 5 minutes, following which the excess solution is drained. The composite is then cured in an oven at a temperature of 120° C. for a period of 30 minutes to produce a semipermeable membrane.

EXAMPLE XI

Likewise, a solution containing 1.3 g of poly(hydroxymethyl methacrylate), 1.16 g of poly(maleic acid), sulfuric acid and a 50/50 mixture of water and ethyl alcohol is handcast on a polysulfone support at ambient temperature and pressure. As in the preceding examples, after a contact time of 3 minutes, excess solution is drained and the composite is cured in an oven at 120° C. for a period of 30 minutes to produce a semipermeable membrane.

EXAMPLE XII

In this example a solution containing poly(hydroxymethyl acrylate), poly(glutaconic acid), sulfuric acid, water and ethyl alcohol is handcast on a porous support backing material comprising microporous polysulfone at ambient temperature and pressure. Upon completion of a predetermined contact time the excess solution is drained and the composite is cured at a temperature of 120° C. for a period of 30 minutes to produce a semipermeable membrane.

EXAMPLE XIII

In like manner, a solution comprising poly(hydroxypropyl methacrylate), poly(citraconic acid), sulfuric acid, water and ethyl alcohol is placed in an appropriate apparatus. A sheet of polysulfone is continuously passed through this bath at a rate of speed sufficient to provide a contact time of the polysulfone sheet with the solution for a period of 3 minutes. The sheet of coated polysulfone is continuously withdrawn, the excess solution is drained therefrom and thereafter the composite is subjected to a curing step in an oven at a temperature of 120° C. for a period of 30 minutes.

Examples of Membranes Prepared with a Prepolymer Formed from a Hydroxyalkyl Acrylate and an Anhydride of a Dicarboxylic Acid

EXAMPLE XIV

A prepolymer may be prepared by slowly admixing a cold solution comprising 1.30 g of poly(hydroxyethyl methacrylate) and 1.0 g triethylamine in dimethylformamide with a cold solution of 1.48 g of phthalic anhydride in dimethylformamide, stirring the mixture at 0° C. for 3–4 hours to complete the esterification process. The prepolymer is then recovered, dried, and re-dissolved in a coating solution comprising the prepolymer, 0.1 g of sulfuric acid and a 50/50 volume/volume mixture of water and ethyl alcohol. A desired chlorine resistant semipermeable membrane may be prepared by handcasting this solution on an 8"×10" microporous polysulfone sheet at ambient temperature and pressure. After a contact time of 3 minutes the excess solution is drained and the composite is cured in an oven at a temperature of 120° C. for a period of 30 minutes.

EXAMPLE XV

In a manner similar to that set forth in Example I above, a prepolymer is prepared by slowly admixing a cold solution comprising 1.3 g of poly(hydroxymethyl methacrylate) and 1.0 g triethylamine in dimethylformamide with a cold solution of 1.0 g of succinic anhydride in dimethylformamide, stirring the mixture at 0° C. for 3–4 hours to complete the esterification process. The prepolymer is then recovered, dried, and re-dissolved in a coating solution comprising the prepolymer, 0.1 g of sulfuric acid, 50 g of water and 60 g of ethyl alcohol. The solution is then handcast on a sheet of microporous polysulfone for a period of 5 minutes, following which the excess solution is drained. The composite is then cured in an oven at a temperature of 120° C. for a period of 30 minutes to produce a semipermeable membrane.

EXAMPLE XVI

Likewise, a cold solution containing 1.3 g of poly(hydroxymethyl methacrylate) and 1.0 g triethylamine in dimethylformamide is slowly admixed in the cold solution of 1.52 g of 1,2-cyclohexanedicarboxylic anhydride in dimethyl formamide, stirring the mixture at 0° C. for 3–4 hours to complete the esterification process. The prepolymer formed is then recovered, dried, and re-dissolved in a coating solution comprising the prepolymer, sulfuric acid and a 50/50 mixture of water and ethyl alcohol is handcast on a polysulfone support at ambient temperature and pressure. As in the preceding examples, after a contact time of 3 minutes, excess solution is drained and the composite is cured in an oven at 120° C. for a period of 30 minutes to produce a semipermeable membrane.

EXAMPLE XVII

In this example a cold dimethylformamide solution containing poly(hydroxymethyl acrylate) and triethylamine is slowly mixed with a cold solution of itaconic anhydride in dimethylformamide, stirring the mixture at 0° C. for 3–4 hours to complete the esterification process. The prepolymer formed is recovered, dried, and re-dissolved in a coating solution comprising the prepolymer, water and ethyl alcohol is handcast on a porous support backing material comprising microporous polysulfone at ambient temperature and pressure. As in the preceding examples, after a contact time of 3 minutes, excess solution is drained and the composite is cured in an oven at 120° C. for a period of 30 minutes to produce a semipermeable membrane. Then in order to polymerize the residual vinyl groups present due to the use of the anhydride of an unsaturated dicarboxylic acid, further curing by irradiation is done. The composite is irradiated at a dose of 3.0 Mrads from a 160 Kev electron beam and the desired chlorine-resistant semipermeable membrane is recovered.

EXAMPLE XVIII

In like manner, a cold dimethylformamide solution comprising poly(hydroxypropyl methacrylate) and triethylamine is slowly mixed with a cold solution of glutaric anhydride in dimethylformamide stirring the mixture for 3–4 hours to complete the esterification process. The prepolymer is recovered, dried, and re-dissolved in a coating solution comprising the prepolymer, sulfuric acid, water and ethyl alcohol is placed in an appropriate apparatus. A sheet of polysulfone is continuously passed through this bath at a rate of speed sufficient to provide a contact time of the polysulfone sheet with the solution for a period of 3 minutes. The sheet of coated polysulfone is continuously withdrawn, the excess solution is drained therefrom and thereafter the composite is subjected to a curing step in an oven at a temperature of 120° C. for a period of 30 minutes.

Examples of Membranes Prepared with a Prepolymer Formed from a Hydroxyalkyl Acrylate and an Acryloyl Halide

EXAMPLE XIX

A prepolymer may be prepared by slowly admixing a cold solution containing 13 g of poly(hydroxyethyl methacrylate) and 10.1 g of triethylamine with a cold solution of 9.05 g of acryloyl chloride in dimethylformamide stirring the mixture for 3–4 hours at 0° C. to complete the esterification reaction. The resultant prepolymer is recovered by separation from the solvent, dried, and re-dissolved in toluene. A chlorine-resistant semipermeable membrane is prepared by handcasting this solution on a 8×10" microporous polysulfone sheet at ambient temperature and pressure. After a period of 3 minutes of contact time the excess solution is drained and the composite is cross-linked by irradiation at 2.0 Mrads with a 160 KeV electron beam and the resulting membrane composite is recovered.

EXAMPLE XX

In like manner, a prepolymer is prepared by slowly admixing a cold solution of 13 g of poly(hydroxymethyl acrylate) and 10.1 g of triethylamine in dimethylformamide with a cold solution of 10.3 g of methacryloyl chloride stirring the mixture at 0° C. for 3–4 hours to complete the esterification process. The resultant prepolymer is recovered, dried, and re-dissolved in a toluene solvent. The resulting solution is then handcast on a sheet of microporous polysulfone for desired contact time of 3 minutes, following which the excess solution is drained. The composite may then be cross-linked by suspending the sheet in a Rayonett Photochemical Reactor equipped with 350nm lamps. After a short exposure time to the ultraviolet light in a nitrogen atmosphere the resulting chlorine resistant semipermeable membrane is then recovered.

EXAMPLE XXI

A prepolymer is prepared by slowly admixing a cold solution of 13.0 g of poly(hydroxyethyl methacrylate) and 10.1 g triethylamine in a solvent comprising N-methylpyrrolidone with a cold solution of 13.5 g of acryloyl bromide stirring the mixture at 0° C. for 3–4 hours to complete the esterification reaction. The prepolymer is recovered, separated from the solvent, dried, and re-dissolved in a toluene solvent to provide a solution. A microporous polysulfone sheet is passed through this bath at a predetermined speed to provide a sheet of coated polysulfone. The excess solution is drained from the sheet and subjected to a cross-linking step in which the sheet is irradiated at a dose of 3.0 Mrad from a 160 KeV electron beam to form a chlorine-resistant semipermeable membrane which is then recovered.

EXAMPLE XXII

In a similar manner, a prepolymer is prepared by slowly admixing a cold solution comprising poly(hydroxypropyl methacrylate) and triethylamine with a methacryloyl bromide solution in dimethylformamide solvent. The resulting prepolymer is then recovered and dissolved along with a photoinitiator comprising p,p'-bis(dimethylamine) benzophenone in a toluene solvent to form a coating solution. A sheet of polysulfone is coated with this solution for a predetermined contact time and thereafter the coated sheet is cross-linked by irradiation from an ultraviolet light source similar to that described in the above example. The resulting membrane is then recovered.

Testing of the Membranes

EXAMPLE XXIII

Samples of the various chlorine-resistant semipermeable membranes which are prepared according to Examples IX through XXII are placed in a cell and a water feed is passed over the surface of the membrane at a feed flow rate of approximately 0.13 gallons per minute. The test conditions which are employed during the tests include a pressure of from 1380 to 2760 kPa (gauge) on one side of the membrane while the other side of the membrane is maintained at atmospheric pressure. During the duration of the test the temperature is maintained at ambient. Various feeds containing 0.2% sodium chloride, 0.2% magnesium sulfate or 0.2% sodium sulfate are passed over the surface of the membrane for a period of one hour while recirculating the retentate and permeate. Samples of the permeate which are taken during this test will show that the rejection rate and flux rate are acceptable for the separation of salts from water. In addition, other tests which are performed will show that the membranes are resistant to chlorine over a relatively long period of time.

I claim as my invention:

1. A process for the preparation of a chlorine-resistant polyester semipermeable membrane which comprises providing resistance to chlorine degradation in a reverse osmosis process by contacting a porous support backing material at contacting conditions with a solution comprising a blend of two polymers which will form a polyester by an acid-catalyzed esterification reaction under curing conditions, said blend comprising a polymeric hydroxyalkyl acrylate and a polymeric monocarboxylic acid or a polymeric polycarboxylic acid, recovering the resultant solution-coated porous support composite, curing said composite at curing conditions to form said polyester, and recovering the resultant chlorine-resistant polyester semipermeable membrane.

2. The process of claim 1 in which said contacting conditions include a temperature in the range of from about ambient to about 60° C., a pressure in the range of from about atmospheric to about 1034 kPa (gauge), and a time in the range of from about 2 seconds to about 5 minutes.

3. The process of claim 1 in which said curing conditions include a temperature in the range of from about 100° C. to about 150° C., a pressure in the range of from about subatmospheric to about 207 kPa (gauge), and a time in the range of from about 10 minutes to about 60 minutes.

4. The process of claim 1 in which said solution comprises an aqueous alcoholic solution.

5. The process of claim 4 in which said polymeric hydroxyalkyl acrylate is selected from the group consisting of poly(hydroxyethyl acrylate), poly(hydroxyethyl methacrylate), poly(hydroxymethyl methacrylate), poly(hydroxymethyl acrylate), or poly(hydroxy propyl methacrylate).

6. The process of claim 4 in which said acryloyl halide is selected from the group consisting of acryloyl chloride, methacryloyl chloride, methacryloyl bromide, or acryloyl bromide.

7. The process of claim 4 is which the base utilized to effect the base-catalyzed esterification comprises triethylamine.

8. The process of claim 1 in which said polymeric hydroxyalkyl acrylate is selected from the group consisting of poly(hydroxyethyl acrylate), poly(hydroxyethyl methacrylate), poly(hydroxymethyl methacrylate), poly(hydroxymethyl acrylate), or poly(hydroxy propyl methacrylate).

9. The process of claim 1 in which said polymeric monocarboxylic acid comprises polyacrylic acid, or poly methacrylic acid.

10. The process of claim 1 in which said polymeric polycarboxylic acid is selected from the group consisting of poly(fumaric) acid, poly(maleic acid), poly(glutaconic) acid, poly(itaconic) acid, or poly (citraconic) acid.

11. The process of claim 1 in which the acid utilized to effect the acid-catalyzed esterification is sulfuric acid or p-toluene sulfonic acid.

12. A process for the preparation of a chlorine-resistant polyester semipermeable membrane which comprises providing resistance to chlorine degradation in a reverse osmosis process by contacting a porous support backing material at contacting conditions with a solution comprising a prepolymer formed by the base-catalyzed esterification of a polymeric hydroxyalkyl acrylate with an anhydride of a dicarboxylic acid, said prepolymer which will form a polyester by an acid-catalyzed esterification reaction under curing conditions, recovering thee resultant solution-coated porous support composite, curing said composite at curing conditions to form said polyester, and recovering the resultant chlorine-resistant polyester semipermeable membrane.

13. The process of claim 12 in which said contacting conditions include a temperature in the range of from about ambient to about 60° C., a pressure in the range of from about atmospheric to about 1034 kPa (gauge), and a time in the range of from about 2 seconds to about 5 minutes.

14. The process of claim 12 in which said curing conditions include a temperature in the range of from about 100° C. to about 150° C., a pressure in the range of from about subatmospheric to about 207 kPa (gauge), and a time in the range of from about 10 minutes to about 60 minutes.

15. The process of claim 12 in which said curing is effected by exposure to a source of ultraviolet irradiation or by exposure to irradiation from an electron beam for unsaturated prepolymers.

16. The process of claim 12 in which said curing is effected in the presence of a free radical initiator or a photoinitiator for unsaturated prepolymers.

17. The process as set forth in claim 9 in which said photoinitiator comprises dimethoxy phenylacetophenone.

18. The process of claim 12 in which said solution comprises an aqueous alcoholic solution.

19. The process of claim 12 in which said polymeric hydroxyalkyl acrylate is selected from the group consisting of poly(hydroxyethyl acrylate), poly(hydroxyethyl methacrylate), poly(hydroxymethyl methacrylate), poly(hydroxymethyl acrylate), or poly(hydroxy propyl methacrylate).

20. The process of claim 12 in which said anhydride of a dicarboxylic acid is selected from the group consisting of phthalic anhydride, 1,2-cyclohexane dicarboxylic anhydride, itaconic anhyride, succinic anhydride, or glutaric anhydride.

21. The process of claim 12 in which the acid utilized to effect the acid-catalyzed esterification is sulfuric acid or p-toluene sulfonic acid.

22. The process of claim 12 in which the base utilized to effect the base-catalyzed esterification comprises triethylamine.

23. A process for the preparation of a chlorine-resistant polyester semipermeable membrane which comprises providing resistance to chlorine degradation in a reverse osmosis process by contacting a porous support backing material at contacting conditions with a solution comprising a prepolymer formed by the base-catalyzed esterification reaction of a polymeric hydroxyalkyl acrylate with an acryloyl halide, said prepolymer which will cross-link during the curing, recovering the resultant solution-coated porous support composite, curing said composite at curing conditions to cross-link said prepolymer, and recovering the resultant chlorine-resistant polyester semipermeable membrane.

24. The process of claim 23 in which said contacting conditions include a temperature in the range of from about −20° C. to about 60° C., a pressure in the range of from about atmospheric to about 1034 kPa (gauge), and a time in the range of from about 2 seconds to about 5 minutes.

25. The process of claim 23 in which said curing conditions include a temperature in the range of from about ambient to about 150° C., at a pressure in the range from about atmospheric to 689 kPa (gauge).

26. The process of claim 23 in which said curing is effected by exposure to a source of ultraviolet irradiation or by exposure to irradiation from an electron beam for unsaturated prepolymers.

27. The process of claim 23 in which said curing is effected in the presence of a free radical initiator or a photoinitiator for unsaturated prepolymers.

28. The process as set forth in claim 27 in which said free radical initiator is benzoyl peroxide or t-butylperoxide.

29. The process of claim 23 in which said solution comprises an aqueous alcoholic solution.

30. A chlorine-resistant semipermeable membrane prepared by the process of claims 1-29.

31. A method of desalination of water by reverse osmosis employing a chlorine-resistant semipermeable membrane prepared by contacting a porous support backing material at contacting conditions with a solution comprising a blend of two polymers which will form a polyester by an acid-catalyzed esterification reaction under curing conditions, said blend comprising a polymeric hydroxyalkyl acrylate and a polymeric monocarboxylic acid or a polymeric polycarboxylic acid, recovering the resultant solution-coated porous support composite, curing said composite at curing conditions to form said polyester, and recovering the resultant chlorine-resistant polyester semipermeable membrane.

32. The process of claim 31 in which said contacting conditions include a temperature in the range of from about ambient to about 60° C., a pressure in the range of from about atmospheric to about 1034 kPa (gauge), and a time in the range of from about 2 seconds to about 5 minutes.

33. The process of claim 31 in which said curing conditions include a temperature in the range of from about 100° C. to about 150° C., a pressure in the range of from about subatmospheric to about 207 kPa (gauge), and a time in the range of from about 10 minutes to about 60 minutes.

34. The process of claim 31 in which said solution comprises an aqueous alcoholic solution.

35. The process of claim 34 in which said polymeric hydroxyalkyl acrylate is selected from the group consisting of poly(hydroxyethyl acrylate), poly(hydroxyethyl methacrylate), poly(hydroxymethyl methacrylate), poly(hydroxymethyl acrylate), or poly(hydroxy propyl methacrylate).

36. The process of claim 34 in which said acryloyl halide is selected from the group consisting of acryloyl chloride, methacryloyl chloride, methacryloyl bromide, or acryloyl bromide.

37. The process of claim 34 is which the base utilized to effect the base-catalyzed esterification comprises triethylamine.

38. The process of claim 31 in which said polymeric hydroxyalkyl acrylate is selected from the group consisting of poly(hydroxyethyl acrylate), poly(hydroxyethyl methacrylate), poly(hydroxymethyl methacrylate), poly(hydroxymethyl acrylate), or poly(hydroxy propyl methacrylate).

39. The process of claim 31 in which said polymeric monocarboxylic acid comprises polyacrylic acid, or poly methacrylic acid.

40. The process of claim 31 in which said polymeric polycarboxylic acid is selected from the group consisting of poly(fumaric) acid, poly(maleic acid), poly(glutaconic) acid, poly(itaconic) acid, or poly(citraconic) acid.

41. The process of claim 31 in which the acid utilized to effect the acid-catalyzed esterification is sulfuric acid or p-toluene sulfonic acid.

42. A method of desalination of water by reverse osmosis employing a chlorine-resistant semipermeable membrane prepared by contacting a porous support backing material at contacting conditions with a solution comprising a prepolymer formed by the base-catalyzed esterification of a polymeric hydroxyalkyl acrylate with an anhydride of a dicarboxylic acid, said prepolymer which will form a polyester by an acid-catalyzed esterification reaction under curing conditions, recovering the resultant solution-coated porous support composite, curing said composite at curing conditions to form said polyester, and recovering the resultant chlorine-resistant polyester semipermeable membrane.

43. The process of claim 42 in which said contacting conditions include a temperature in the range of from about ambient to about 60° C., a pressure in the range of from about atmospheric to about 1034 kPa (gauge), and a time in the range of from about 2 seconds to about 5 minutes.

44. The process of claim 42 in which said curing conditions include a temperature in the range of from about 100° C. to about 150° C., a pressure in the range of from about subatmospheric to about 207 kPa (gauge), and a time in the range of from about 10 minutes to about 60 minutes.

45. The process of claim 42 in which said curing is effected by exposure to a source of ultraviolet irradiation or by exposure to irradiation from an electron beam for unsaturated prepolymers.

46. The process of claim 42 in which said curing is effected in the presence of a free radical initiator or a photoinitiator for unsaturated prepolymers.

47. The process as set forth in claim 46 in which said photoinitiator comprises dimethoxy phenylacetophenone.

48. The process of claim 42 in which said solution comprises an aqueous alcoholic solution.

49. The process of claim 42 in which said polymeric hydroxyalkyl acrylate is selected from the group consisting of poly(hydroxyethyl acrylate), poly(hydroxyethyl methacrylate), poly(hydroxymethyl methacrylate), poly(hydroxymethyl acrylate), or poly(hydroxy propyl methacrylate).

50. The process of claim 42 in which said anhydride of a dicarboxylic acid is selected from the group consisting of phthalic anhydride, 1,2-cyclohexane dicarboxylic anhydride, itaconic anhydride, succinic anhydride, or glutaric anhydride.

51. The process of claim 42 in which the acid utilized to effect the acid-catalyzed esterification is sulfuric acid or p-toluene sulfonic acid.

52. The process of claim 42 in which the base utilized to effect the base-catalyzed esterification comprises triethylamine.

53. A method of desalination of water by reverse osmosis employing a chlorine-resistant semipermeable membrane prepared by contacting a porous support backing material at contacting conditions with a solution comprising a prepolymer formed by the base-catalyzed esterification reaction of a polymeric hydroxyalkyl acrylate with an acryloyl halide, said prepolymer which will cross-link during the curing, recovering the resultant solution-coated porous support composite, curing said composite at curing conditions to cross-link said prepolymer, and recovering the resultant chlorine-resistant polyester semipermeable membrane.

54. The process of claim 53 in which said contacting conditions include a temperature in the range of from about −20° C. to about 60° C., a pressure in the range of from about atmospheric to about 1034 kPa (gauge), and a time in the range of from about 2 second to about 5 minutes.

55. The process of claim 53 in which said curing conditions include a temperature in the range of from about ambient to about 150° C., at a pressure in the range from about atmospheric to 689 kPa (gauge).

56. The process of claim 53 in which said curing is effected by exposure to a source of ultraviolet irradiation or by exposure to irradiation from an electron beam for unsaturated prepolymers.

57. The process of claim 53 in which said curing is effected in the presence of a free radical initiator or a photoinitiator for unsaturated prepolymers.

58. The process as set forth in claim 57 in which said free radical initiator is benzoyl peroxide or t-butylperoxide.

59. The process of claim 53 in which said solution comprises an aqueous alcoholic solution.

* * * * *

UNITED STATES PATENT AND TRADEMARK OFFICE
CERTIFICATE OF CORRECTION

PATENT NO. : 5,013,448
DATED : May 7, 1991
INVENTOR(S) : A.X. Swamikannu

It is certified that error appears in the above-indentified patent and that said Letters Patent is hereby corrected as shown below:

Column 7, line 35: "basecatalyzed" should read --base-catalyzed--
Column 10, line 28: delete "15"
Column 19, line 19: "thee" should read --the--
Column 19, line 43. "Claim 9" Should read --Claim 13 --.
Column 20, line 34: before "claims" insert --any one of--
Column 22, line 39: "second" should read --seconds--

Signed and Sealed this

Twenty-sixth Day of October, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,013,448
DATED : May 7, 1991
INVENTOR(S) : A. X. Swamikannu

It is certified that error appears in the above-identified patent and that said Letters Patent is hereby corrected as shown below:

Column 7, line 35: "basecatalyzed" should read --base-catalyzed--
Column 10, line 28: delete "15"
Column 19, line 19: "thee" should read --the--
Column 19, line 43: "claim 9" should read --claim 16--
Column 20, line 34: before "claims" insert --any one of--
Column 22, line 39: "second" should read --seconds--

This certificate supersedes Certificate of Correction issued October 26, 1993

Signed and Sealed this

Twenty-first Day of December, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,013,448
DATED : May 7, 1991
INVENTOR(S) : A. X. Swamikannu

It is certified that error appears in the above-identified patent and that said Letters Patent is hereby corrected as shown below:

Column 19, line 43: "Claim 9" should read --Claim 16--

Signed and Sealed this

Thirtieth Day of May, 1995

Attest:

BRUCE LEHMAN

Attesting Officer     Commissioner of Patents and Trademarks